US008861677B2

(12) United States Patent
Gray et al.

(10) Patent No.: US 8,861,677 B2
(45) Date of Patent: Oct. 14, 2014

(54) APPARATUS AND METHOD FOR ELECTROMAGNETIC INSPECTION OF CANNULA ALIGNMENT

(75) Inventors: Fred Eric Gray, Mesa, AZ (US); Justin Miller, Fountain Hills, AZ (US); Marla Meyer, Tempe, AZ (US)

(73) Assignee: West Pharmaceutical Services, Inc., Exton, PA (US)

( * ) Notice: Subject to any disclaimer, the term of this patent is extended or adjusted under 35 U.S.C. 154(b) by 796 days.

(21) Appl. No.: 13/152,808

(22) Filed: Jun. 3, 2011

(65) Prior Publication Data
US 2012/0307972 A1 Dec. 6, 2012

(51) Int. Cl.
*G06K 9/00* (2006.01)
*G06T 7/00* (2006.01)

(52) U.S. Cl.
CPC ..... *G06T 7/0004* (2013.01); *G06T 2207/30136* (2013.01); *G06T 2207/10116* (2013.01); *G06T 2207/30242* (2013.01)
USPC ............................................ 378/62; 378/206

(58) Field of Classification Search
USPC ..................... 378/57, 62, 205–206
See application file for complete search history.

(56) References Cited

U.S. PATENT DOCUMENTS

| 5,590,170 A | 12/1996 | Zweig |
| 5,909,478 A | 6/1999 | Polichar et al. |
| 2004/0168293 A1 | 9/2004 | Shimazaki |
| 2011/0064194 A1 * | 3/2011 | Glocker et al. ................. 378/62 |

OTHER PUBLICATIONS

Emdtadmin, "Line 3D X-Ray Inspection," http://www.emdt.co.uk/print/101, creation date: Jan. 4, 2006, pp. 1-3.
Bbuntz, "X-Ray Technology in Medical Device Manufacturing," http://www.emdt.co.uk/print/2156, creation date: Mar. 3, 2010, pp. 1-5.

* cited by examiner

*Primary Examiner* — Hoon Song
(74) *Attorney, Agent, or Firm* — Panitch Schwarze Belisario & Nadel LLP

(57) ABSTRACT

A syringe inspection device and method for determining the position of a cannula in a cannula shield attached to a syringe. An electromagnetic radiation emitter is configured to emit electromagnetic radiation having a propagation axis. An electromagnetic radiation detector has an inspection window defined by a beam restrictor. A mount is configured to releasably retain the syringe between the emitter and the detector such that a longitudinal axis of the syringe is substantially coincident with the propagation axis. An image analyzer is operatively coupled to the detector. The image analyzer is configured to produce a syringe rejection signal when the cannula is irradiated and an electromagnetic image in the inspection window has two or less distinctly separate objects based on a contiguity of pixels having substantially like-valued intensity.

11 Claims, 6 Drawing Sheets

APPARATUS AND METHOD FOR ELECTROMAGNETIC INSPECTION OF CANNULA ALIGNMENT

BACKGROUND OF THE INVENTION

The present invention is directed to an apparatus and method for the electromagnetic inspection of cannula alignment. More particularly, the present invention is directed to an apparatus and method for the electromagnetic inspection of cannula alignment in a cannula shield attached to a syringe.

Syringes are often supplied with a cannula (or needle) that is pre-attached to the syringe barrel and covered by a cannula shield during manufacturing. A common method of forming the outlet of a syringe barrel is to roll the barrel whilst it is in a heated and softened condition onto a mandrel to form a hole into which the cannula is bonded. For safety purposes, a cannula shield is placed over the cannula and firmly but removably attached to the syringe barrel. Desirably, the longitudinal axes of the syringe barrel, the cannula and the cannula shield should be coincident. However, during the manufacturing process, the cannula and/or the cannula shield may be angularly displaced from the longitudinal axis of the syringe barrel. In such instances, the cannula may pierce the cannula shield. Accordingly, the syringe must be inspected during the manufacturing process to assure that the cannula, cannula shield and syringe barrel are properly aligned.

To determine the angular displacement of the cannula within a cannula shield, some conventional electromagnetic inspection devices may have two radiation sources that are able to irradiate and penetrate the cannula shield from two different locations preferably spaced about the longitudinal axis approximately forty-five to ninety degrees apart. Other conventional electromagnetic inspection devices may have a mechanism that rotates the syringe to obtain images from two different perspectives. Such conventional inspection devices require the analysis of two images to determine the angular displacement of the cannula.

Accordingly, there is a need in the art for an apparatus and method for the electromagnetic inspection of cannula alignment based on the analysis of a single image as opposed to multiple images.

BRIEF SUMMARY OF THE INVENTION

Briefly stated, one aspect of the invention is directed to a cannula shield inspection device for determining a position of a cannula in a cannula shield, the cannula and cannula shield attached to a syringe having a longitudinal axis. The inspection device comprises an electromagnetic imager having an emitter and a detector. The imager is configured to emit electromagnetic radiation having a propagation axis. The detector has an inspection window defined by a beam restrictor. A mount is configured to releasably retain the syringe between the emitter and the detector such that the longitudinal axis of the syringe is substantially coincident with the propagation axis and to support the beam restrictor. An image analyzer is operatively coupled to the detector. The image analyzer comprises one or more processors, memory and one or more programs stored in the memory and configured to be executed by the one or more processors. The one or more programs comprise a first set of instructions producing an electromagnetic image of the electromagnetic radiation received by the detector, a second set of instructions parsing the electromagnetic image into a number of distinctly separate objects based on a contiguity of pixels having substantially like-valued intensity, and a third set of instructions appling a heuristic causing the processor to produce a syringe rejection signal when the number of distinctly separate objects is less than or equal to two.

Another aspect of the invention is a cannula shield inspection method for determining a position of a cannula in a cannula shield, the cannula and cannula shield attached to a syringe having a longitudinal axis comprising the steps of: positioning the syringe between a emitter and a detector of an electromagnetic imager configured to emit electromagnetic radiation having a propagation axis such that the longitudinal axis of the syringe is substantially coincident with the propagation axis; restricting propagation of the electromagnetic radiation by placing a beam restrictor between the syringe and the detector, the beam restrictor defining a detector inspection window; irradiating the syringe with electromagnetic radiation produced by the emitter; producing an image of the electromagnetic radiation received by the detector with an image analyzer operatively coupled to the detector, the image analyzer comprising one or more processors, memory, and one or more programs stored in the memory and configured to be executed by the one or more processors, the one or more programs including image analysis instructions for determining the number of objects appearing in an electromagnetic image of the electromagnetic radiation received by the detector and one or more heuristics utilizing an object count to determine whether the syringe with the attached cannula and cannula shield passes or fails an inspection criteria; and analyzing the image by executing with the one or more processors the one or more programs.

Another aspect of the invention is aspect of the invention is a syringe inspection device for acceptance testing a syringe having a cannula in a cannula shield. The inspection device comprises an electromagnetic radiation emitter configured to emit electromagnetic radiation having a propagation axis. An electromagnetic radiation detector has an inspection window defined by a beam restrictor. A mount is configured to releasably retain the syringe between the emitter and the detector such that a longitudinal axis of the syringe is substantially coincident with the propagation axis. An image analyzer is operatively coupled to the detector. The image analyzer is configured to produce a syringe rejection signal when the cannula is irradiated and an electromagnetic image in the inspection window has two or less distinctly separate objects based on a contiguity of pixels having substantially like-valued intensity.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
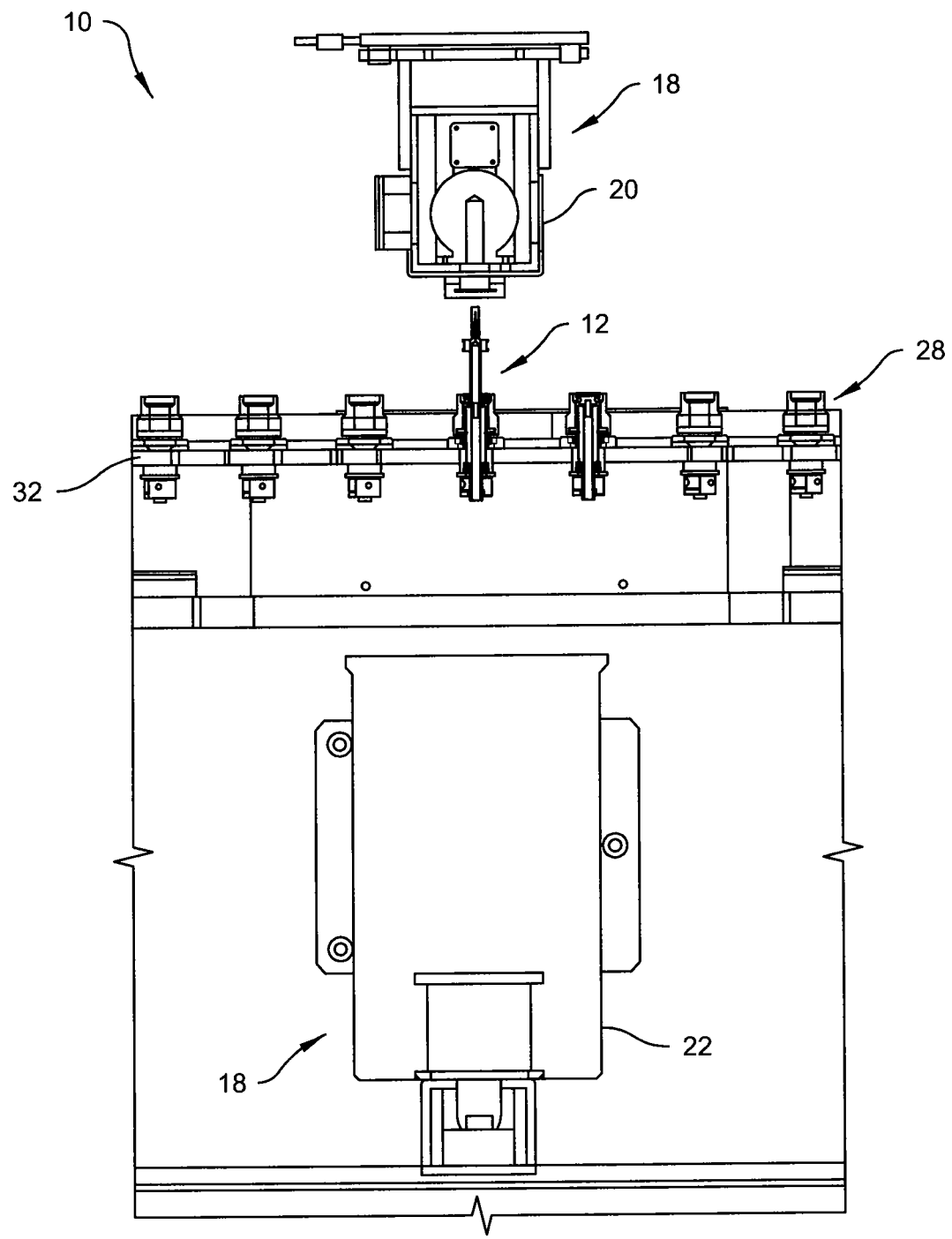
FIG. 1 is a side cross sectional view of a preferred embodiment of a cannula shield inspection device in accordance with the present invention.
Figure 2:
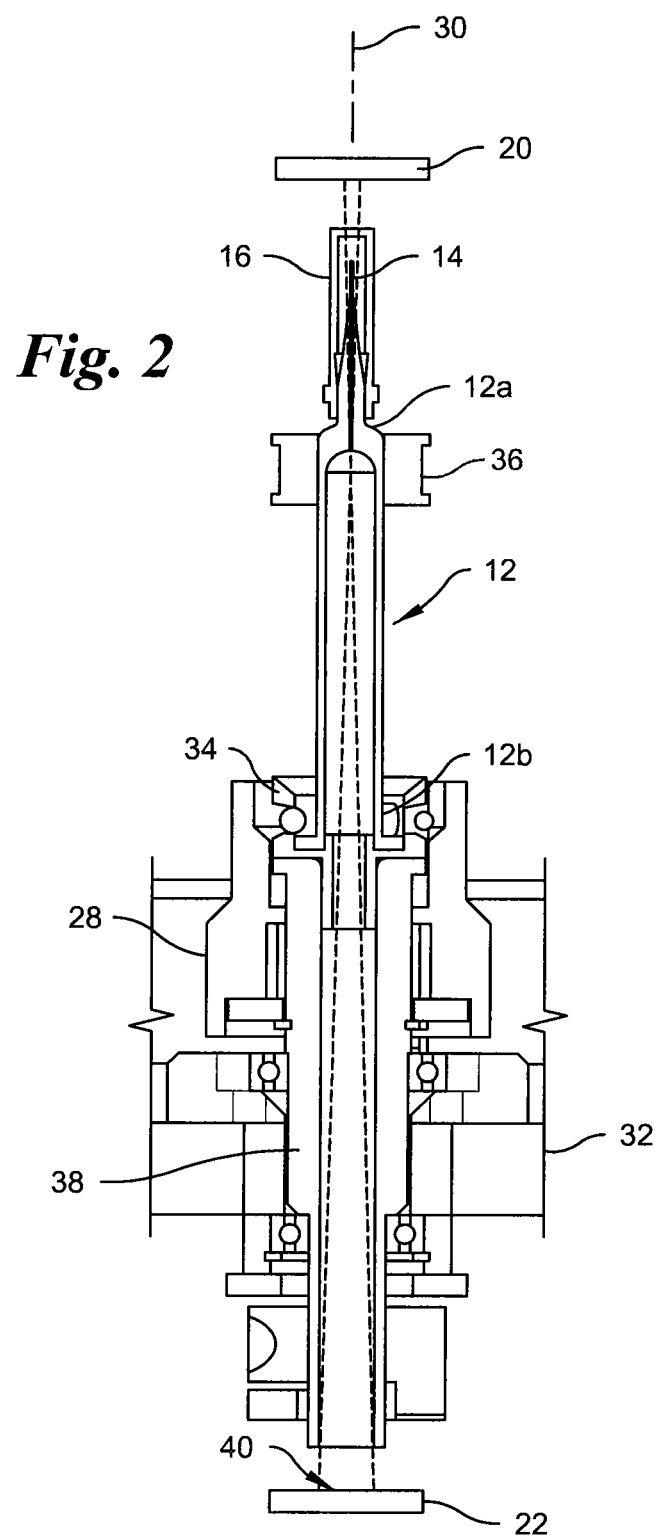
FIG. 2 is an enlarged side cross sectional view the mount and syringe of FIG. 1.
Figure 3:
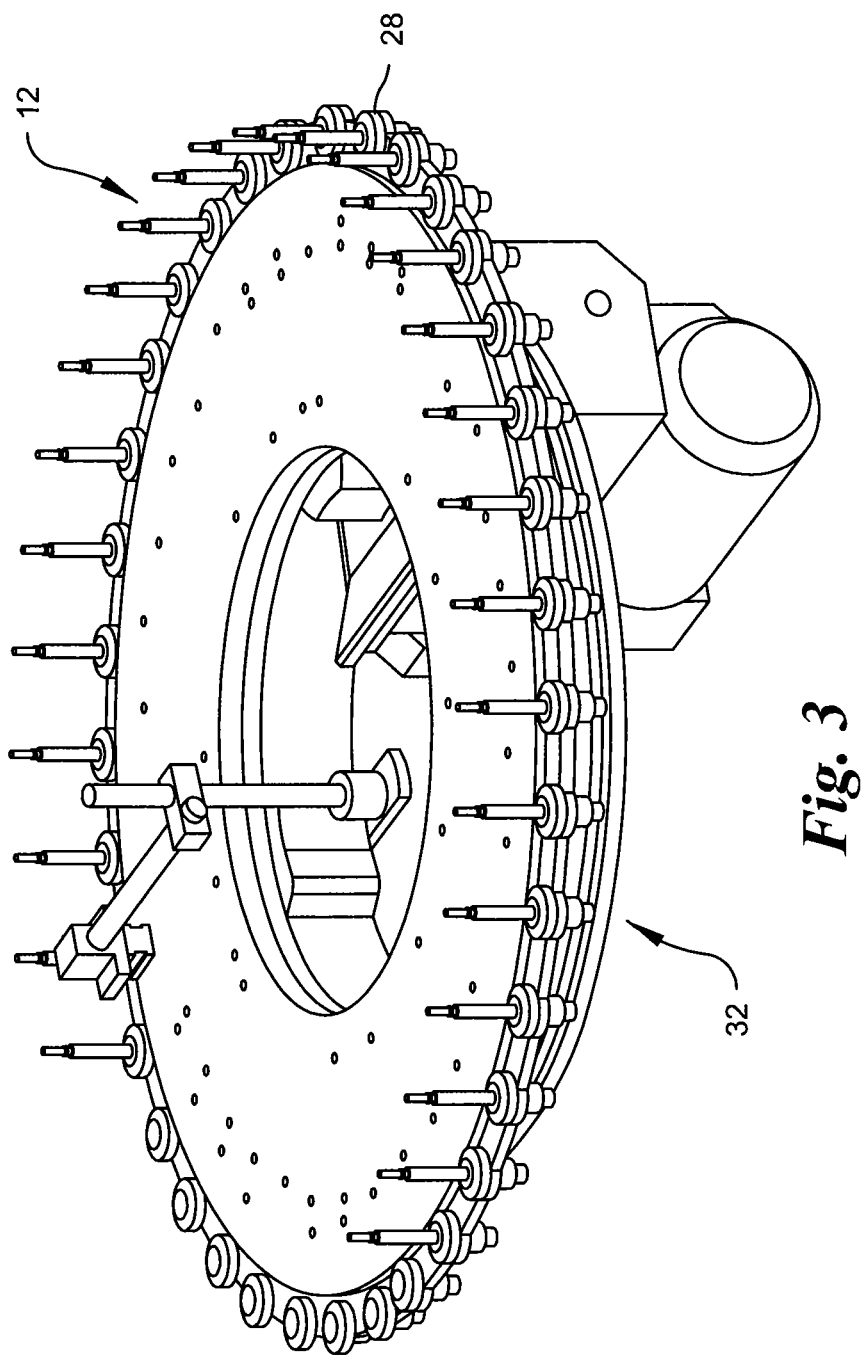
FIG. 3 is a top perspective view of a rotary dial supporting a plurality of the mounts of FIG. 2.
Figure 4:
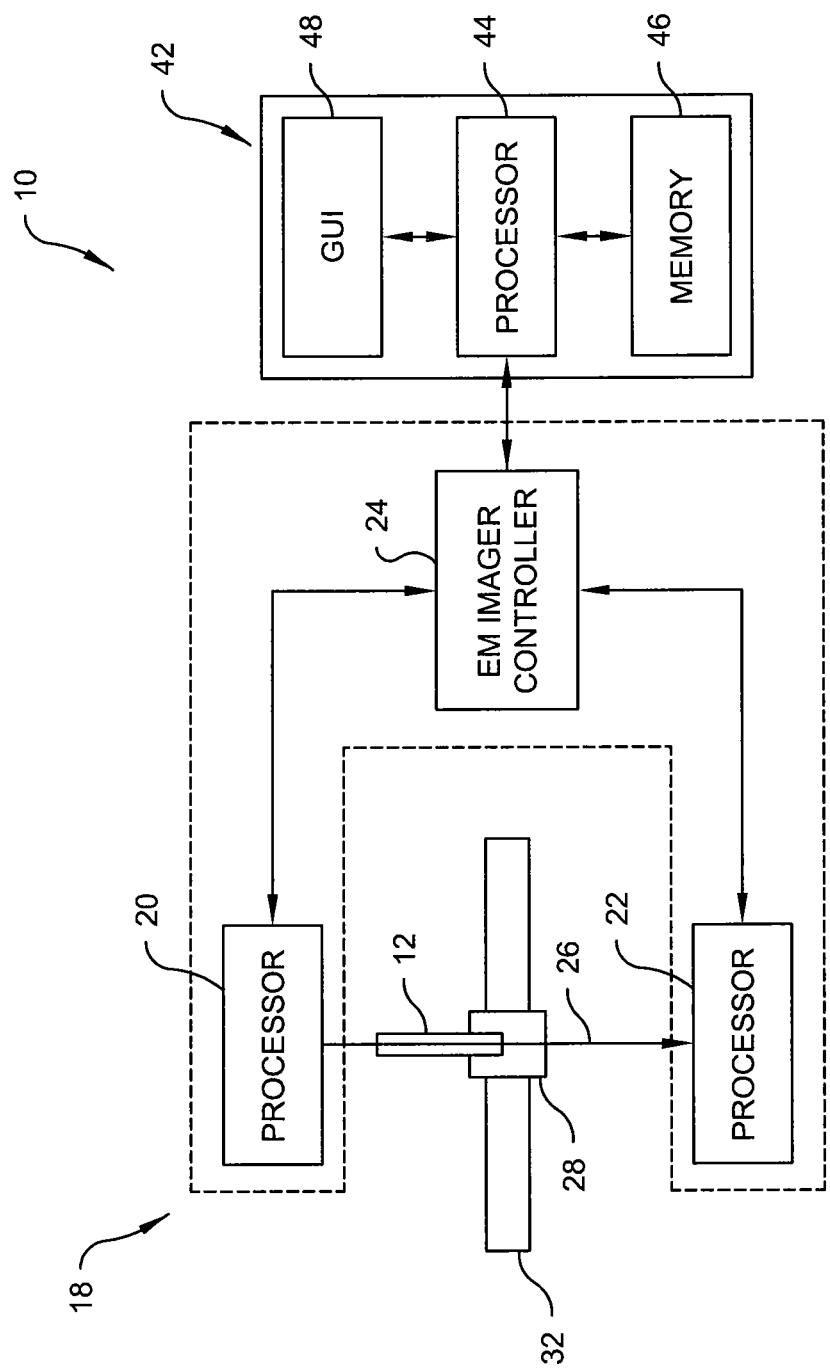
FIG. 4 is schematic block diagram of the inspection device of FIG. 1.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the cannula safety shield, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first set could be termed a second set, and, similarly, a second set could be termed a first set, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a system and method for determining cannula position inside a cannula shield of a pharmaceutical syringe in accordance with the present invention. The structural elements described below and the functions performed by the elements may be present in certain embodiments of the present invention; other embodiments may include additional and/or fewer structural elements, with the same, different, or overlapping functions.

Referring to the drawings in detail, where like numerals indicate like elements throughout, there is shown in FIGS. 1-4 a preferred embodiment of a cannula shield inspection device, generally designated 10, and hereinafter referred to as the "inspection device" 10 in accordance with the present invention. The inspection device 10 may be used for inspecting a syringe 12 having a first end 12a to which a cannula 14 is attached and covered by a cannula shield 16 also attached to the syringe 12 and determining the relative position of the cannula 14 in the cannula shield 16.

The inspection device 10 comprises an electromagnetic imager 18 having an emitter 20 and a detector 22 in electrical communication with an imager controller 24. The imager 18 is configured to emit electromagnet radiation having a propagation axis 26. The term electromagnetic radiation as used herein, and in any appended claims, refers to radiation that is generated either by radioactive sources, or by electronic devices such as x-ray tubes, and encompasses within the term all forms of penetrating radiation including gamma rays. Preferably, the electromagnetic radiation is X-ray radiation. Imagers such as electromagnetic imager 18 are commercially available from companies such as KVM Rockford, Ill. 61109 and National X-ray, Flowery Branch, Ga. 30542.

The inspection device 10 further comprises a mount 28 configured to releasably retain the syringe 12 between the emitter 20 and the detector 22 such that the longitudinal axis 30 of the syringe 12 is substantially coincident with the propagation axis 26 of the electromagnetic radiation. In some embodiments, the mount 28 may be supported by a rotary dial 32 configured to feed a plurality of mounts 28 between the emitter 20 and the detector 22. Other well known structures such as a conveyor may be used to transport the mount 28.

In some embodiments, the mount 28 may releasably retain the second end 12b of the syringe 12 in a mechanism such as a chuck 34. In other embodiments, in addition to the chuck or other releasably retaining mechanism, the mount 28 may maintain the longitudinal axis 30 of the syringe 12 substantially coincident with the propagation axis 26 in cooperation with an alignment gripper 36 configured to releasably gasp the syringe 12.

In some embodiments, the mount 28 may have a beam restrictor 38 positioned below the second end 12b of the syringe 12. The beam restrictor 38 defines an inspection window 40 for the detector 22. The beam restrictor 38 may be fabricated from any material that attenuates the propagation of electromagnetic radiation and is desirably fabricated from a metallic substance and preferably from stainless steel. Preferably, the beam restrictor 38 is a tube with a cylindrical cross section. Desirably, the cylindrical tube has an inner diameter equivalent to a predetermined permissible maximum angular displacement that the cannula may have relative to the longitudinal axis 30 of the syringe 12 before the cannula touches or penetrates the wall of the cannula shield 16. The permissible maximum angular displacement of the cannula may vary among syringes having different configurations for the cannula and the cannula shield as the permissible displacement is based on such factors as the length of the cannula 14 and the clearance between the cannula 14 and the inner diameter of the cannula shield 16. Preferably, the inner diameter of the beam restrictor 38 is sized to be equivalent to about a two degree cannula bend relative to the longitudinal axis 30 of the syringe 12.

The inspection device 10 further comprises an image analyzer 42 operatively coupled to the detector 22. The image analyzer 42 includes one or more processors 44 in electrical communication with electronic memory 46, the electromagnetic imager 18 and a user interface 48. One or more programs are stored in the memory 46 and are configured to be executed by the one or more processors 44. The one or more programs may include a first set of instructions for producing an electromagnetic image of the electromagnetic radiation received by the detector 12, a second set of instructions for parsing the electromagnetic image into a number of distinctly separate objects based on a contiguity of pixels having substantially like-valued intensity and a third set of instructions applying a heuristic causing the processor to produce a syringe rejection signal when the number of distinctly separate objects is less than or equal to two. The heuristic may also cause the processor to produce a syringe acceptance signal when the number of distinctly separate objects equals three.

In some embodiments, the electromagnetic image may be displayed by the user interface 48 for viewing and analysis by an operator of the inspection device 10, thereby allowing operator participation and/or intervention in the acceptance testing of a syringe based on the perceived degree to which a cannula is displaced from the longitudinal axis of the syringe. In some embodiments, the one or more programs includes additional instructions for applying one or more heuristics to the electromagnetic image to determine the position of the cannula 14 inside the cannula shield 16 without operator intervention as further discussed below with respect to FIGS. 5 and 6.

Figure 5:
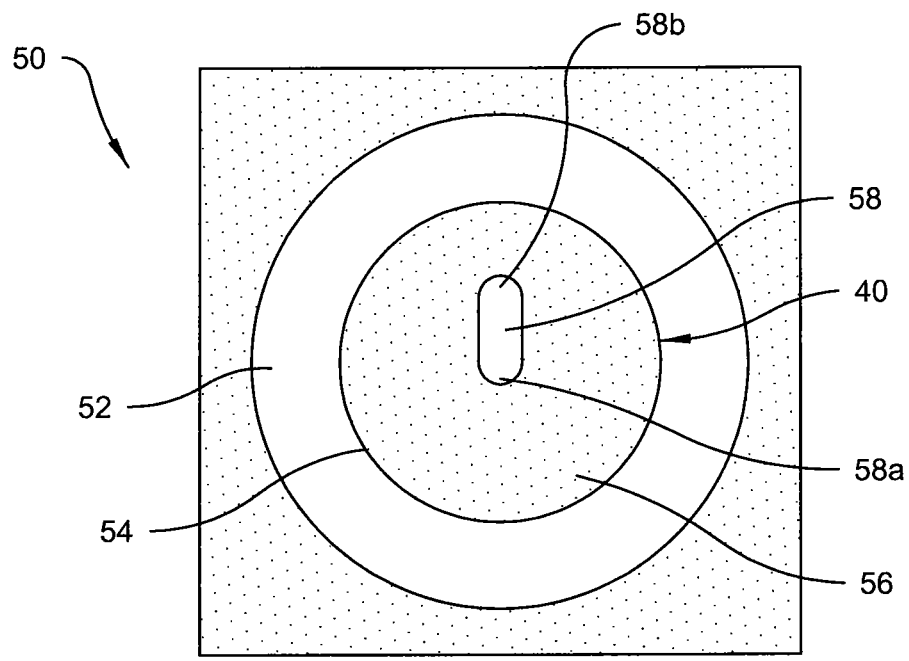
FIG. 5 is an electromagnetic image produced by the inspection device of FIG. 1 showing an inspection widow for a syringe that satisfies an inspection acceptance heuristic in accordance with a preferred embodiment of the present invention.

FIG. 5 is a schematic diagram of a first electromagnetic image 50 produced by the electromagnetic imager 18 of the inspection device 10 after a first syringe (not shown) having a first cannula has been irradiated. An annular ring 52 appearing in the first electromagnetic image 50 corresponds to the cross-sectional wall thickness of the beam restrictor 38 (see, FIG. 2) and forms a frame bounding the inspection window 40. The inner circumference 54 of the annular ring 52 defines the permissible maximum angular displacement of a cannula 14 relative to the longitudinal axis 30 of the syringe 12. The gray circular area 56 comprising the inspection window 40 is produced by the electromagnetic radiation that passes through to the hollow center portion of the beam restrictor 38 and irradiates the detector 22.

A first cannula image 58 appearing generally in the center of the inspection window 40 in the first electromagnetic image 50 corresponds to the first cannula of the syringe. The first cannula image 58 has a generally elongated shape having a first end 58a and a second end 58b spaced radially outwardly from the first end 58a. The first end 58a of the first cannula image 58 corresponds to the base of the first cannula as the first cannula exits the syringe and is generally coincident with the longitudinal axis of the syringe. The second end 58b of the first cannula image 58 corresponds to the tip of the first cannula. The length of the cannula image 58 corresponds to the angular displacement of the first cannula relative to the longitudinal axis of the syringe to which it is attached.

In general, the first electromagnetic image 50 may be parsed into three distinct separable images (or objects): the annular ring 52, the circular area 56 comprising the inspection window 40 and the elongated cannula image 58 within and completely surrounded by the circular area 56. The extent of each image may be recognizable as a specific pattern (or arrangement) of contiguous pixels or uninterrupted area of similar intensity.

Figure 6:
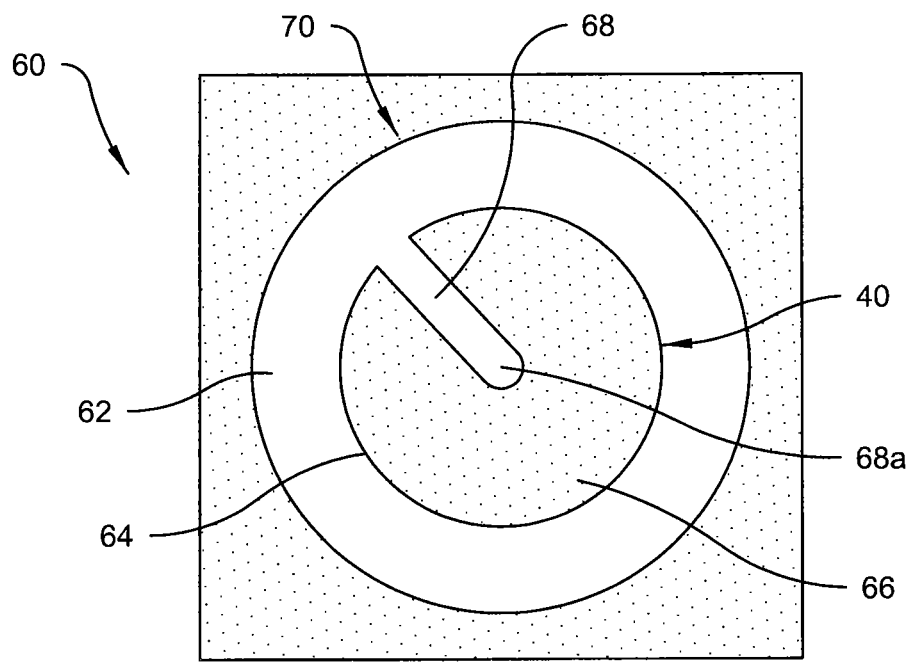
FIG. 6 is another electromagnetic image produced by the inspection device of FIG. 1 showing an inspection window for a syringe that does not satisfy the inspection acceptance heuristic of FIG. 5.

FIG. 6 is a schematic diagram of a second electromagnetic image 60 produced by the electromagnetic imager 18 of the inspection device 10 after a second syringe (not shown) having a second cannula has been irradiated. Similar to the first electromagnetic image 50 of FIG. 5, a second annular ring 62 appearing in the second electromagnetic image 60 corresponds to the cross-sectional wall thickness of the beam restrictor 38 and forms a frame bounding the inspection window 40. The inner circumference 64 of the second annular ring 62 defines the permissible maximum angular displacement of a cannula 14 relative to the longitudinal axis 30 of the syringe 12. The second gray circular area 66 comprising the inspection window 40 is produced by the electromagnetic radiation that passes through to the hollow center portion of the beam restrictor 38 and irradiates the detector 22.

A partial second cannula image 68 appearing in the inspection window 40 in the second electromagnetic image 60 corresponds to a portion of the second cannula of another syringe (not shown) that has been irradiated. The partial second cannula image 68 has a generally elongated shape having a first end 68a that corresponds to the base of the second cannula as the second cannula exits the another syringe and is generally coincident with the longitudinal axis of the syringe. The tip of the second cannula does not appear as part of the partial second cannula image 68 in the second electromagnetic image 60 as the angular displacement of the second cannula relative to the longitudinal axis of the another syringe to which it is attached is greater than the angular displacement of the first cannula and exceeds the radius of the inspection window 40. As a result, the beam restrictor 38 blocks the electromagnetic radiation that irradiated the tip of the second cannula from propagating to the detector.

In general, the second electromagnetic image 60 may be parsed into two distinct separable images (or objects): a combination object 70 formed by the annular ring 62 and the partial second cannula image 68, and the circular area 66 comprising the inspection window 40, the extent of each image being recognizable as a specific pattern (or arrangement) of contiguous pixels or uninterrupted area of similar intensity.

In some embodiments, the separate and distinct objects perceivable in FIGS. 5 and 6 allow one or more heuristics to utilize an object count as the basis for determining whether the syringe 12 with the attached cannula 14 and cannula shield 16 passes or fails acceptance criteria. More specifically, upon parsing the electromagnetic image 50, 60 into distinctly separate objects based on the contiguity of pixels having substantially like-valued intensity, the processor 44 of the image analyzer 42 may execute instructions that determine the number of distinctly separate objects appearing in the electromagnetic image 50, 60 and apply a heuristic that rejects the syringe 12 when the object count equals two or less objects, for example, the combination object 70 and the circular area 56, 66, and accept the syringe 12 when the object count equals three objects, for example, the annular ring 52, the circular area 56 and the elongated cannula image 58. In some embodiments, a set of processor executed instructions applying the heuristic causes the processor to produce a syringe rejection signal when the number of distinctly separate objects is less than or equal to two. In other embodiments, the heuristic may cause the processor to also produce a syringe acceptance signal when the number of distinctly separate objects equals three.

Figure 7:
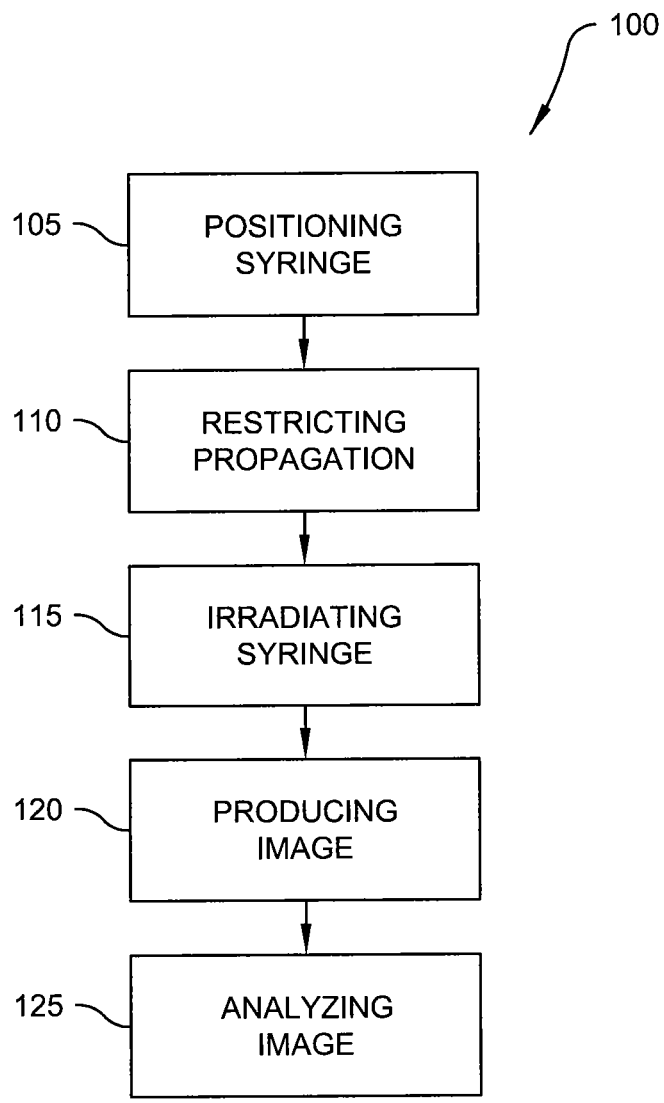
FIG. 7 is a functional flow diagram of a preferred embodiment of a method for determining the position of a cannula in a cannula shield in accordance with the present invention

Another embodiment of the invention is directed to a cannula shield inspection method, generally designated 100 and hereafter referred to as the "inspection method" 100, for determining a position of a cannula in a cannula shield, the cannula and cannula shield attached to a syringe having a longitudinal axis. With reference now to FIG. 7, the steps of the inspection method 100 are illustrated and disclosed below with reference to a preferred use of the one or more of the embodiments cannula shield inspection devices disclosed above.

In a positioning step 105, a syringe 12 is positioned between a emitter 20 and a detector 22 of an electromagnetic imager 18 configured to emit electromagnetic radiation having a propagation axis 26 such that the longitudinal axis 30 of the syringe 12 is substantially coincident with the propagation axis 26.

In a restricting step 110, the propagation of the electromagnetic radiation is restricted by placing a beam restrictor 38 defining a detector inspection window 40 between the syringe 12 and the detector 22.

In the irradiating step 115, the syringe 12 is irradiated with electromagnetic radiation produced by the emitter 20.

In the producing step 120, an image 50, 60 of the electromagnetic radiation received by the detector 22 is produced with an image analyzer 42 operatively coupled to the detector 22. The image analyzer 42 comprises one or more processors 44, memory 46, and one or more programs stored in the memory 46 and configured to be executed by the one or more processors 44. The one or more programs includes image analysis instructions for determining the number of objects appearing in an electromagnetic image of the electromagnetic radiation received by the detector and one or more heuristics utilizing an object count to determine whether the syringe with the attached cannula and cannula shield passes or fails an inspection criteria.

In the analyzing step 125, the image is analyzed by executing with the one or more processors the one or more programs. In some embodiments, the inspection method 100 may produce a syringe rejection signal when the object count is less than or equal to two. In other embodiments, the inspection method 100 may also produce a syringe acceptance signal when the object count is greater than or equal to three.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

We claim:

1. A cannula shield inspection device for determining a position of a cannula in a cannula shield, the cannula and cannula shield attached to a syringe having a longitudinal axis, the inspection device comprising:
   an electromagnetic imager having an emitter and a detector, the imager configured to emit electromagnetic radiation having a propagation axis, the detector having an inspection window defined by a beam restrictor;
   a mount configured to releasably retain the syringe between the emitter and the detector such that the longitudinal axis of the syringe is substantially coincident with the propagation axis and to support the beam restrictor; and
   an image analyzer operatively coupled to the detector, the image analyzer comprising:
      one or more processors;
      memory; and
      one or more programs stored in the memory and configured to be executed by the one or more processors, the one or more programs comprising:
         a first set of instructions producing an electromagnetic image of the electromagnetic, radiation received by the detector;
         a second set of instructions parsing the electromagnetic image into a number of distinctly separate objects based on a contiguity of pixels having substantially like-valued intensity; and
         a third set of instructions applying a heuristic causing the processor to produce a syringe rejection signal when the number of distinctly separate objects is less than or equal to two.

2. The cannula shield inspection device according to claim 1, wherein the heuristic causes the processor to produce a syringe acceptance signal when the number of distinctly separate objects equals three.

3. The cannula shield inspection device according to claim 1, wherein the electromagnetic radiation is X-ray radiation.

4. The cannula shield inspection device according to claim 1, wherein the beam restrictor is a cylindrical tube.

5. The cannula shield inspection device according to claim 4, wherein the cylindrical tube has an internal diameter equivalent to about a two degree cannula bend relative to the longitudinal axis of the syringe.

6. The cannula shield inspection device according to claim 1, wherein the syringe has a first end to which the cannula is attached and the mount releasably retains a second end of the syringe.

7. The cannula shield inspection device according to claim 1, wherein the mount is supported by a rotary dial configured to feed the mount between the emitter and detector.

8. The cannula shield inspection device according to claim 1, wherein the mount maintains the longitudinal axis of the syringe substantially coincident with the propagation axis in cooperation with an alignment gripper configured to gasp the syringe.

9. A cannula shield inspection method for determining a position of a cannula in a cannula shield, the cannula and cannula shield attached to a syringe having a longitudinal axis comprising the steps of:
   positioning the syringe between an emitter and a detector of an electromagnetic imager configured to emit electromagnetic radiation having a propagation axis such that the longitudinal axis of the syringe is substantially coincident with the propagation axis;
   restricting propagation of the electromagnetic radiation by placing a beam restrictor between the syringe and the detector, the beam restrictor defining a detector inspection window;
   irradiating the syringe with electromagnetic radiation produced by the emitter;
   producing an image of the electromagnetic radiation received by the detector with an image analyzer operatively coupled to the detector, the image analyzer comprising one or more processors, memory, and one or more programs stored in the memory and configured to be executed by the one or more processors, the one or more programs including image analysis instructions for determining the number of objects appearing in an electromagnetic image of the electromagnetic radiation received by the detector and one or more heuristics utilizing an object count to determine whether the syringe with the attached cannula and cannula shield passes or fails an inspection criteria; and
   analyzing the image by executing with the one or more processors the one or more programs.

10. The method of claim 9 further comprising producing a syringe rejection signal when the object count is less than or equal to two.

11. A syringe inspection device for acceptance testing a syringe having a cannula in a cannula shield, the inspection device comprising:
   an electromagnetic radiation emitter configured to emit electromagnetic radiation having a propagation axis;

an electromagnetic radiation detector having an inspection window defined by a beam restrictor;

a mount configured to releasably retain the syringe between the emitter and the detector such that a longitudinal axis of the syringe is substantially coincident with the propagation axis; and an image analyzer operatively coupled to the detector, the image analyzer configured to produce a syringe rejection signal when the cannula is irradiated and an electromagnetic image in the inspection window has two or less distinctly separate objects based on a contiguity of pixels having substantially like-valued intensity.

* * * * *